United States Patent
Kumar et al.

(10) Patent No.: US 9,904,565 B2
(45) Date of Patent: Feb. 27, 2018

(54) SUBSEQUENT OPERATION INPUT REDUCTION SYSTEMS AND METHODS FOR VIRTUAL MACHINES

(75) Inventors: Sumit Kumar, Maharashtra (IN); Mukund Agrawal, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 807 days.

(21) Appl. No.: 13/364,246

(22) Filed: Feb. 1, 2012

(65) Prior Publication Data
US 2013/0198742 A1   Aug. 1, 2013

(51) Int. Cl.
*G06F 9/455* (2006.01)

(52) U.S. Cl.
CPC ............ *G06F 9/45558* (2013.01); *G06F 2009/45579* (2013.01)

(58) Field of Classification Search
CPC .............. G06F 2009/45579; G06F 9/45558
See application file for complete search history.

(56) References Cited

U.S. PATENT DOCUMENTS

| | | | | |
|---|---|---|---|---|
| 8,996,468 | B1* | 3/2015 | Mattox | G06F 17/30 707/650 |
| 2005/0132206 | A1* | 6/2005 | Palliyil | G06F 21/566 713/188 |
| 2007/0233698 | A1* | 10/2007 | Sundar | G06F 8/60 |
| 2009/0132616 | A1* | 5/2009 | Winter | G06F 11/1451 |
| 2009/0164522 | A1* | 6/2009 | Fahey | H04L 63/1441 |
| 2010/0169881 | A1* | 7/2010 | Silvera | G06F 8/63 718/1 |
| 2010/0211616 | A1* | 8/2010 | Khandelwal | G06F 12/0868 707/812 |
| 2010/0299667 | A1* | 11/2010 | Ahmad | G06F 12/1018 718/1 |
| 2011/0055471 | A1* | 3/2011 | Thatcher | G06F 3/0608 711/114 |
| 2011/0138144 | A1* | 6/2011 | Tamura et al. | 711/166 |
| 2011/0218969 | A1* | 9/2011 | Anglin | G06F 11/1453 707/679 |
| 2011/0307657 | A1* | 12/2011 | Timashev et al. | 711/112 |

* cited by examiner

*Primary Examiner* — James J Lee
(74) *Attorney, Agent, or Firm* — Patent Law Works LLP

(57) ABSTRACT

Storage systems and methods are presented. A method can include: accessing virtual machine image information; performing an examination process on the virtual machine image information to determine characteristics of the virtual machine image information including temporary attributes of the virtual machine image information; performing an exclusion block identification process based upon results of the examination process to identify exclusion blocks, wherein exclusion blocks are identified for exclusion from a subsequent operation; and forwarding an indication of the exclusion blocks to the subsequent operation. In one embodiment the method is performed within a File Server.

20 Claims, 9 Drawing Sheets

100

110

Perform an exclusion indication process.

120

Exclude information from a subsequent operation based upon the exclusion indication process performed in block 110.

Access virtual machine disk image information.

220

Perform an examination process on the virtual machine disk image to determine characteristics of the information.

230
Perform an exclusion block identification process based upon results of the examination process to identify exclusion blocks.

240
Forward an indication of the preclusion blocks to the subsequent operation.

310
Create a list of files that represent a temporary transit part of a virtual image and not suitable for de-duplication

320
On start of a de-dup scan, get blocks (data as well as metadata blocks) used by files listed in step 310 after loopback mounting of the virtual machine disk image which resides in a mounted checkpoint

330
Access a list of regions which have been modified on the virtual machine disk image

710
An exclusion indication module

711
Access virtual machine disk image module.

712
An examination module (e.g., to determine characteristics of the information in the virtual machine disk image).

713
An exclusion block identification module.

714
Exclusion block indication forwarding module.

720
Exclusion Module

FIG 7

SUBSEQUENT OPERATION INPUT REDUCTION SYSTEMS AND METHODS FOR VIRTUAL MACHINES

The present embodiments relate to the field of information storage management (e.g., de-duplication, backup, etc.).

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information.

The information and data generated and utilized by various systems is often valuable and extensive, and losing the data can be very detrimental. A number of traditional approaches attempt to utilize data recovery and backup scenarios to facilitate preservation of the data. However, traditional approaches often involve storage of large amounts of duplicate information. Storage of duplicate copies of files can consume or occupy significant amounts of resources (e.g., storage resources, etc.). However, attempts at de-duplication can also consume or occupy significant amounts of resources (e.g., processing bandwidth to perform the de-duplication process, etc.). There can be a lot of data which is more likely to change or get deleted in the near future, but get "unnecessarily" de-duplicated during the de-duplication of a whole virtual machine image (e.g., vmdk, etc.). Conventional attempts at reducing de-duplication of temporary data inside a virtual machine are typically limited and usually sit inside a host operating system (e.g., ESX server) or inside a guest operating system itself but do not work directly with a file server or storage unit.

SUMMARY

Storage systems and methods are presented. In one embodiment a method includes: accessing virtual machine image information; performing an examination process on the virtual machine image information to determine characteristics of the virtual machine image information including temporary attributes of the virtual machine image information; performing an exclusion block identification process based upon results of the examination process to identify exclusion blocks, wherein exclusion blocks are identified for exclusion from a subsequent operation; and forwarding an indication of the exclusion blocks to the subsequent operation. In one embodiment the method is performed within a File Server.

It is appreciated the method can be utilized in conjunction with a variety of operations. In one embodiment, the exclusion blocks are excluded from a subsequent de-duplication operation. The exclusion blocks can be excluded from a subsequent backup operation. The exclusion blocks can include virtual storage blocks storing information with a short life cycle with respect to the life cycle of other information associated with a virtual machine. The exclusion blocks can include virtual storage blocks storing information that has been frequently modified since a previous de-duplication process. In one exemplary implementation, the exclusion blocks include virtual storage blocks storing other information that are otherwise designated for de-duplication avoidance.

In one embodiment, a reprogrammable tangible computer readable medium has stored thereon, computer executable instructions that when executed by a computer system cause the computer system to perform a method comprising: accessing virtual machine image information; performing an examination process on the virtual machine image information to determine characteristics of the virtual machine image information including temporary attributes of the virtual machine image information; performing an exclusion block identification process based upon results of the examination process to identify exclusion blocks, wherein exclusion blocks are identified for exclusion from a subsequent operation; and forwarding an indication of the exclusion blocks to the subsequent operation. In one embodiment the method is performed within a File Server.

It is appreciated that a variety of operations can be performed in accordance with instructions stored on the computer readable medium. In one embodiment, the exclusion blocks are excluded from a subsequent de-duplication operation. The exclusion blocks can be excluded from a subsequent backup operation. The exclusion blocks can include virtual storage blocks storing information with a short life cycle with respect to the life cycle of other information associated with a virtual machine. The exclusion blocks can include virtual storage blocks storing information that has been frequently modified since a previous de-duplication process. In one exemplary implementation, the exclusion blocks include virtual storage blocks storing other information that are otherwise designated for de-duplication avoidance.

In one embodiment, a computer system comprises: a processor coupled to a computer readable storage media and executing computer readable code which causes the computer system to perform operations including: accessing virtual machine image information; performing an examination process on the virtual machine image information to determine characteristics of the virtual machine image information including temporary attributes of the virtual machine image information; performing an exclusion block identification process based upon results of the examination process to identify exclusion blocks, wherein exclusion blocks are identified for exclusion from a subsequent operation; and forwarding an indication of the exclusion blocks to the subsequent operation. In one embodiment the method is performed within a File Server.

It is appreciated that a variety of operations can be performed by the processor in accordance with instructions included on the computer readable medium. In one embodiment, the exclusion blocks are excluded from a subsequent de-duplication operation. The exclusion blocks can be excluded from a subsequent backup operation. The exclusion blocks can include virtual storage blocks storing information with a short life cycle with respect to the life cycle of other information associated with a virtual machine. The exclusion blocks can include virtual storage blocks storing information that has been frequently modified since a previous de-duplication process. In one exemplary implementation, the exclusion blocks include virtual storage blocks storing other information that are otherwise designated for de-duplication avoidance.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 1 is a flow chart of an exemplary input reduction method in accordance with one embodiment of the present invention.

FIG. 2 is a block diagram of exemplary an exclusion indication process in accordance with one embodiment of the present invention.

FIG. 3 is a flow chart of an exemplary exclusion block identification process in accordance with one embodiment of the present invention.

FIG. 7 is a block diagram of exemplary input reduction module in accordance with one embodiment of the present invention.

DETAILED DESCRIPTION

Figure 4:
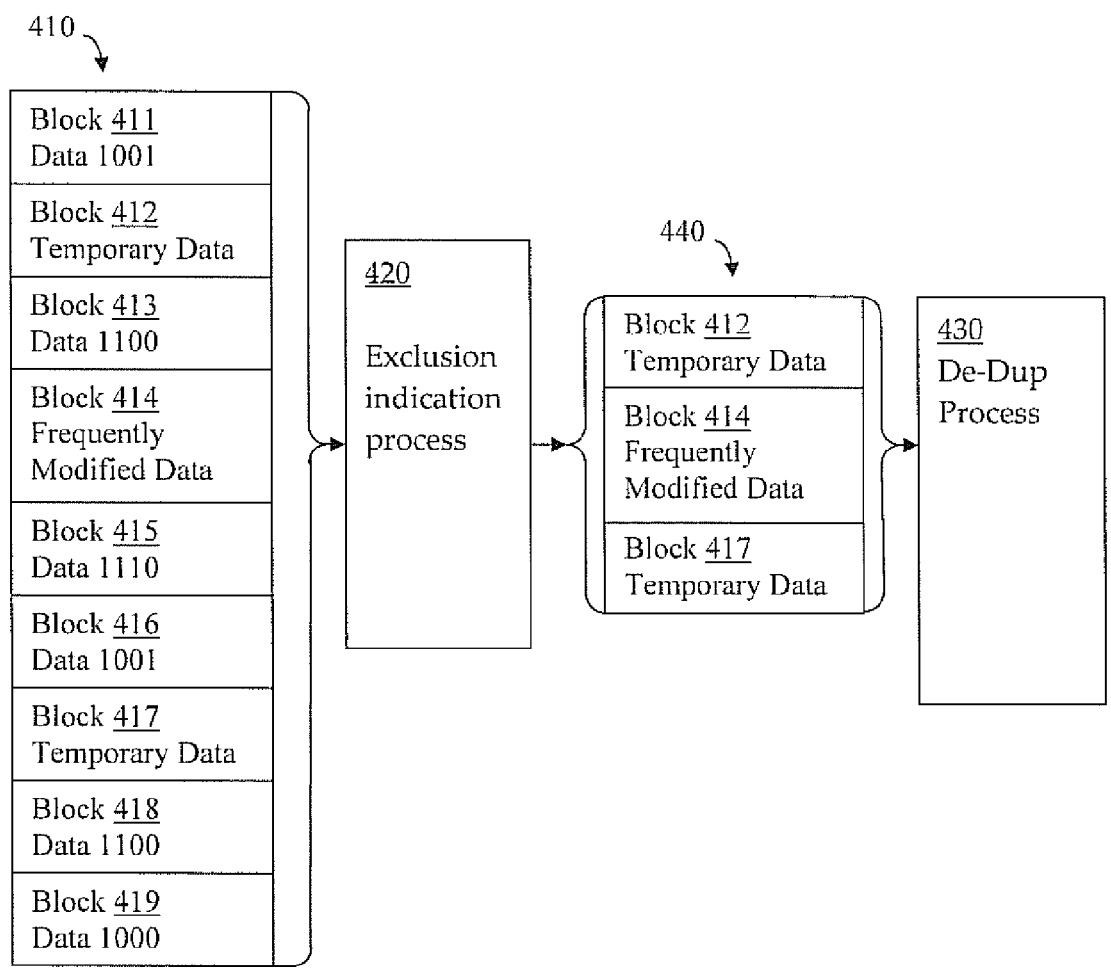
FIG. 4 is a block diagram of an exemplary notification of exclusion block indication in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

Systems and methods described in the following detailed description can facilitate efficient and effective management (e.g., de-duplication, backup, etc.) of information storage. In one embodiment, an input reduction method reduces or limits the amount of input (e.g. temporary data, frequently modified data, other designated data, etc.) that is forwarded to a subsequent operation (e.g., de-duplication operations, back-up operations, etc.). In one exemplary implementation, an input reduction method limits or reduces the amount of input that is forwarded to a subsequent operation by examining information and identifying portions associated with various qualities or characteristics (e.g., temporary data, frequently modified data, user designated data, etc.). The identified information is excluded from further processing (e.g., de-duplication, backup, etc.) by the subsequent operations.

In one embodiment, a system and method is described that facilitates avoidance of de-duplication processing of some information (e.g., temporary files, information that is frequently modified, information that is not considered a good candidate for de-duplication, etc.). One of the strong use cases of storage products is associated with network file sharing (e.g., NFS. etc.) of a file system in a high availability manner in which the storage products act as an Datastore for virtual machines. In one embodiment, various operations (e.g., duplication, backup, etc.) can be performed with reduced amounts of resource occupation by the operations that has a little or no chance of offering significant benefits. In one exemplary implementation, files that are frequently modified or that are not likely to be stored very long (e.g., temporary files, files that are relatively quickly erased, etc.) are identified and not forwarded for further processing (e.g., backup, de-duplication, etc.). In one embodiment, the main objective is to provide a mechanism with which the de-duplication engine or backup engine can avoid operating on virtual machine temporary/transit data which has a short life cycle.

FIG. 1 is a flow chart of exemplary input reduction method 100 in accordance with one embodiment of the present invention. Input reduction method 100 can facilitate improved efficiency and effectiveness in a variety of operations. In one exemplary implementation, input method 100 facilitates reduced occupation of processing resources associated with de-duplication and back-up operations.

In step 110, an exclusion indication process is performed. An exclusion indication can be associated with an information that should be excluded from a subsequent operation. In one exemplary implementation, an indication is forwarded that information for which the results of a subsequent operation will have little or no benefit should be excluded from input to the subsequent operation (e.g., blocks of information associated with frequently modified information, blocks of information associated with temporary information, etc.).

In step 120, information is excluded from a subsequent operation based upon the exclusion indication process performed in block 110. It is appreciated excluded indications can be utilized with a variety of subsequent operations. In one embodiment, blocks of information associated with frequently modified information and blocks of information temporary information included in a virtual image are excluded from further processing by a de-duplication operation. In one embodiment, blocks of information associated with temporary information included in a virtual image are excluded from further processing by a back-up operation.

FIG. 2 is a block diagram of exemplary exclusion indication process 200 in accordance with one embodiment of the present invention. In one embodiment, the exclusion indication process indicates or identifies blocks of information that should be excluded from a subsequent operation. In one exemplary implementation, the exclusion indication process is performed within a File Server.

In step 210, virtual machine image information is accessed. The virtual machine image information can be accessed from a virtual machine disk (e.g., VMDK, etc.).

In step 220, an examination process is performed on the virtual machine image information to determine characteristics of the information. In one embodiment, the examination process is performed on the virtual machine disk image to determine if the information is associated with particular life cycle characteristics. The life cycle characteristics (e.g., short, long, etc.) can be compared to or "relative to" the life cycle of other information. In one exemplary implementation the examination process is performed on the virtual machine disk image to determine temporary attributes of the information. In one embodiment, the examination process is performed on the virtual machine disk image to determine if there is frequently modified information.

In step 230, an exclusion block identification process is performed based upon results of the examination process to identify exclusion blocks, wherein exclusion blocks are identified for exclusion from a subsequent operation. The exclusion blocks can include information with temporary attributes. In one embodiment, the exclusion blocks include information with a short life cycle with respect to the life cycle of a virtual storage image. The exclusion blocks can include information that has been frequently or often modified (e.g., approximately every 15 minutes, one or more times every hour, 5-10 time a day etc.) since a previous de-duplication process. The exclusion blocks can include other information that is otherwise designated for de-duplication avoidance. The exclusion blocks can be identified for exclusion from a variety of subsequent operations (e.g., de-duplication, backup, etc.).

In step 240, an indication of the exclusion blocks is forwarded to the subsequent operation. It is appreciated the indentified exclusion blocks can be forwarded for use in a variety of operations. In one embodiment, the indication of the exclusion blocks is forwarded to a de-duplication process. In one embodiment, the indication of the exclusion blocks is forwarded to a backup process. It is appreciated that a de-duplication process and a backup process can be performed in an integrated manner together or can be performed completely separately and independently.

In one embodiment, while blocks associated with files that are frequently modified are excluded from subsequent de-duplication operations, other blocks modified blocs (e.g., associated with information that is not frequently modified, etc.) are included in subsequent de-duplication operations.

In one exemplary implementation, files that are frequently modified or that are not likely to be stored very long (e.g., temporary files, files that are relatively quickly erased, etc.) are identified and not forwarded for further de-duplication processing. In one embodiment, the main objective is to provide a mechanism with which the de-duplication engine can avoid de-duplication of virtual machine temporary/transit data which can have short life cycle. One example includes doing de-duplication of vmware vmdk file and avoiding de-duplication of virtual machine swap files, etc.

In one embodiment, a storage product can provide de-duplication service for stored virtual machine images using VxFS checkpoint and file change log technologies. In the case of a virtualized environment, a de-duplication solution can de-duplicate a virtual machine image which is represented by a virtual disk file (e.g. VMDK file in case of VMware). Whatever changes that happen in the guest OS vmdk file, can eventually come to the VxFS file system through a NFS (or iSCSI) protocol and can get tracked in File change log.

In one embodiment, a File change log can track the writes that happen on a virtual machine disk (e.g., vmdk) image and can include a mechanism to figure out which parts of a virtual machine disk file should be considered for processing by a de-duplication process and which parts should be avoided. In one embodiment, to avoid de-duplication of a temporary/transit part of virtual image, a list of files is prepared (and the blocks associated with them) that are not suitable for de-duplication and the list is passed to a de-duplication engine.

FIG. 3 is a flow chart of an exemplary exclusion block identification process 300 in accordance with one embodiment of the present invention. In one embodiment, an exclusion block identification process 300 is similar to an exclusion block identification process performed in step 220.

In step 310, a list of files is created that represent a temporary transit part of a virtual image and not suitable for de-duplication. The list of files can be OS dependent. Like for Linux operating system based VMs, the process can avoid swap files (e.g., vmswp, vmdk.nvram, etc.) where as for windows bases OS the process can avoid C:\page.sys file. In one embodiment, an interface can be provided to a user so that in case a user wants to avoid de-duplication of any file, the user (e.g., he/she) can use this interface to pass the file name to the system.

In step 320, on start of a de-dup scan, get blocks (e.g., data as well as metadata blocks, etc.) used by files listed in step 310 after loopback mounting of the virtual machine disk image which resides in a mounted checkpoint. In one embodiment, a de-dup engine is using the read only checkpoint and the inode to block mapping of a file remains the same through out the scan cycle of a de-duplication instance.

In step 330, access a list of regions which have been frequently modified on the virtual machine disk image. In one embodiment, the list of regions which have been frequently modified on the virtual machine disk image already exists as part of other operations. In one exemplary implementation a File Change Log (FCL) & file block map (fbmap) interface are utilized to access the list of regions which have been frequently modified on the virtual machine disk image.

In one embodiment, the output or results of an exclusion block identification process can include two lists. A first list of regions which represents temporary files in virtual disk image for which it is not desirable to perform de-duplication and a second list of regions which have been frequently modified. These two lists can be passed to a de-dup system and at the time of de-duplication can mask out regions for which we want avoid de-duplication. The lists can be combined into a single list. In one exemplary implementation, the intersection of the two lists mentioned above is established and de-duplication of the common blocks is avoided.

Apart from the above "default" lists of files, there may be some other files which a user may not want to de-duplicate. In one embodiment, the other files include non-persistent vmdk disk images which are probably going to vanish after some time. One of the examples can be, a downloaded copy of the virtual machine which a user knows that it has to commit back to original data store and it would be good to avoid de-dup of it. To avoid de-duplication of these type of files, a user can use an interface for inputting the list of files and passing the file names to the system for avoidance of de-duplication. These indications can be forwarded as a separate individual list or can be combined with other lists (e.g., list of temporary files, list of frequently modified files, etc.) to form a single list.

FIG. 4 is a block diagram of an exemplary notification of exclusion block indication in accordance with one embodiment of the present invention. A virtual machine image includes blocks 411 through 419 which are examined by exclusion indication process 420. Block 411, 413, 415, 416, 418 and 419 include data other than temporary data or frequently modified data. Blocks 412 and 417 include temporary data and block 414 includes frequently modified data. Exclusion indication process 420 examines the information in blocks 411 through 419, identifies blocks 412 and 417 include temporary data and block 414 includes frequently modified data as exclusion blocks and forwards exclusion block indication 440 to de-duplication process 430.

Figure 5:
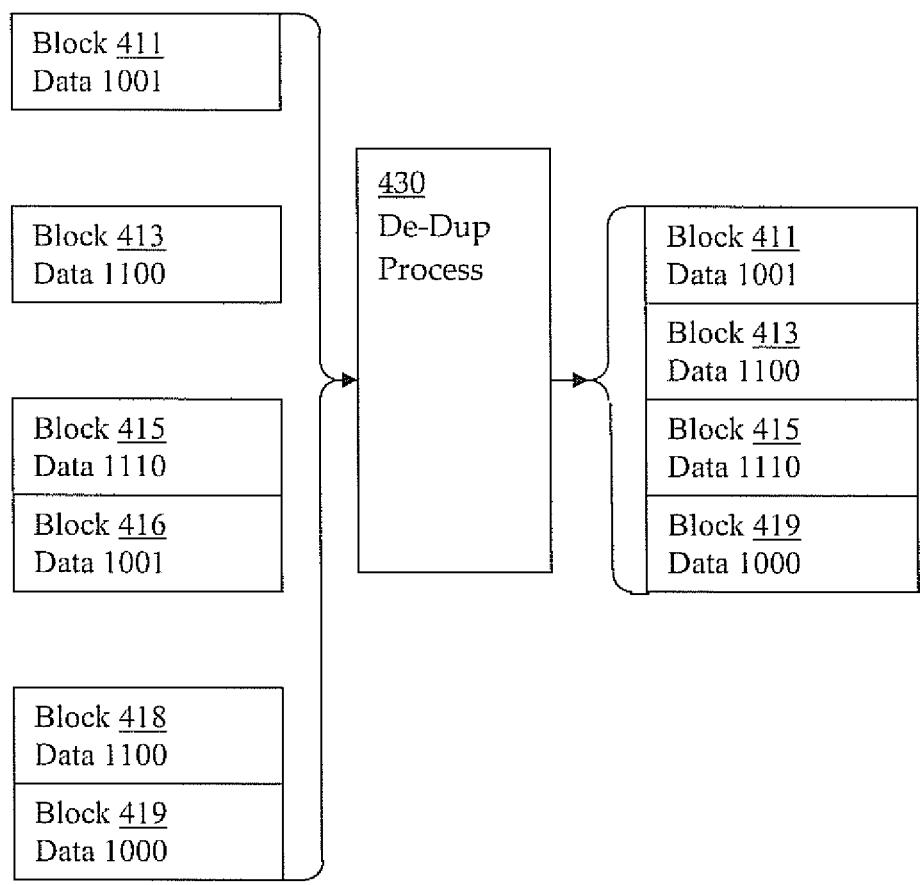
FIG. 5 is a block diagram of an exemplary de-duplication in accordance with one embodiment of the present invention.

FIG. 5 is a block diagram of an exemplary de-duplication in accordance with one embodiment of the present invention. De-duplication process 430 utilizes the exclusion block indication 440 (e.g., shown in FIG. 4) to exclude the identified blocks (e.g., 412, 414 and 417) from de-duplication and performs de-duplication removing duplicate blocks 416 and 418 (e.g., data 1001 and data 1100 in blocks 416 and 418 are duplicates of data 1001 and 110 in blocks 411 and 413 respectively) and blocks 411, 413, 415 and 419 are stored. In one embodiment, the blocks 412 and 417 including temporary data and the block 414 including frequently modified data are also stored.

The present invention systems and methods can also get integrated with or access other systems which have the capabilities to figure out files inside virtual machine image with various characteristics (e.g., temporary files, modified files, etc.). The information can be gathered or access from such systems and then can be utilized or integrated with exclusion indication processes (e.g., process 100, 200, 300, etc.) to avoid subsequent operations (e.g., de-duplication, backup, etc.) on the files identified by the other systems.

Figure 6:
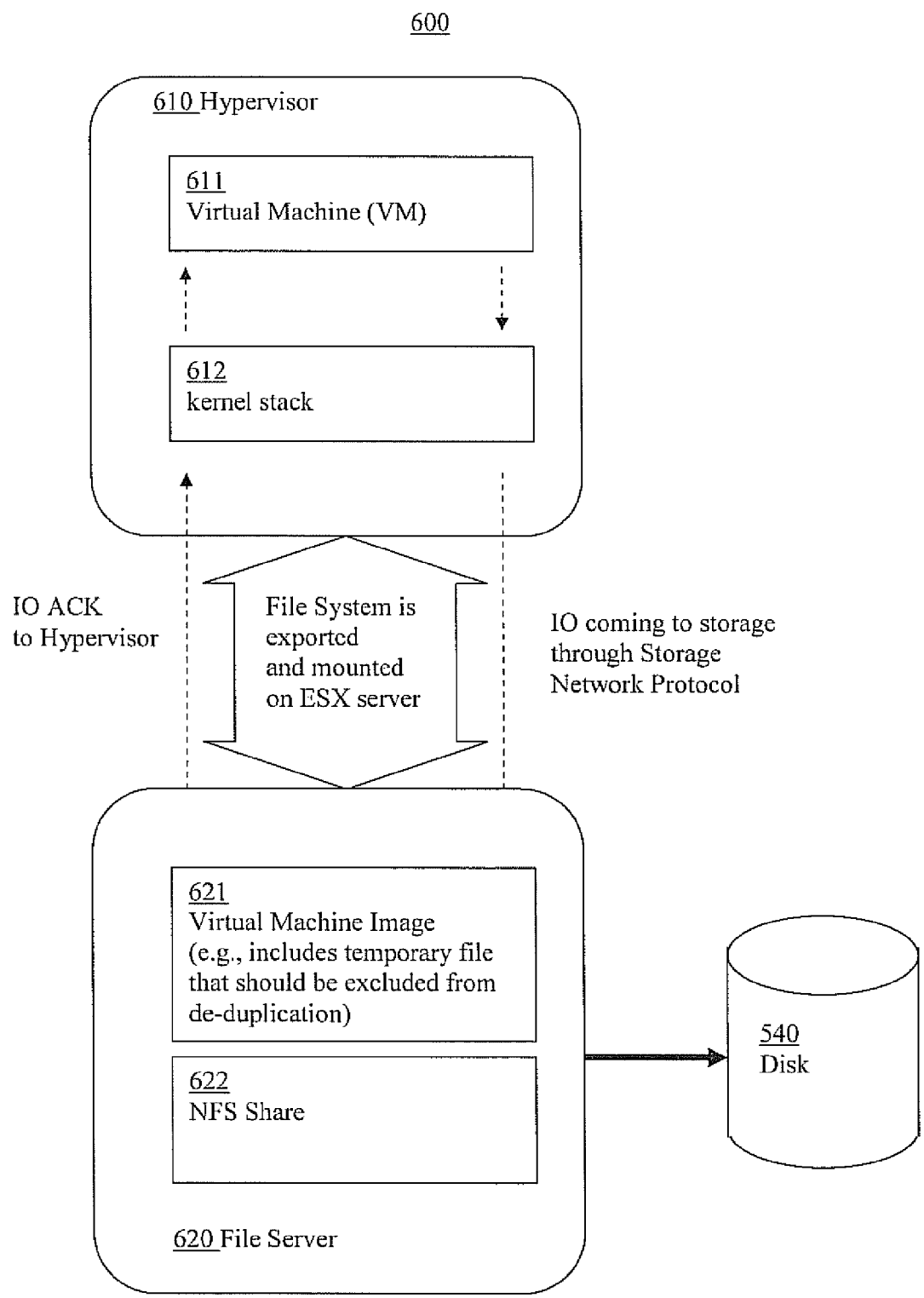
FIG. 6 is a block diagram of an exemplary architecture in accordance with one embodiment of the present invention.
Figure 8:
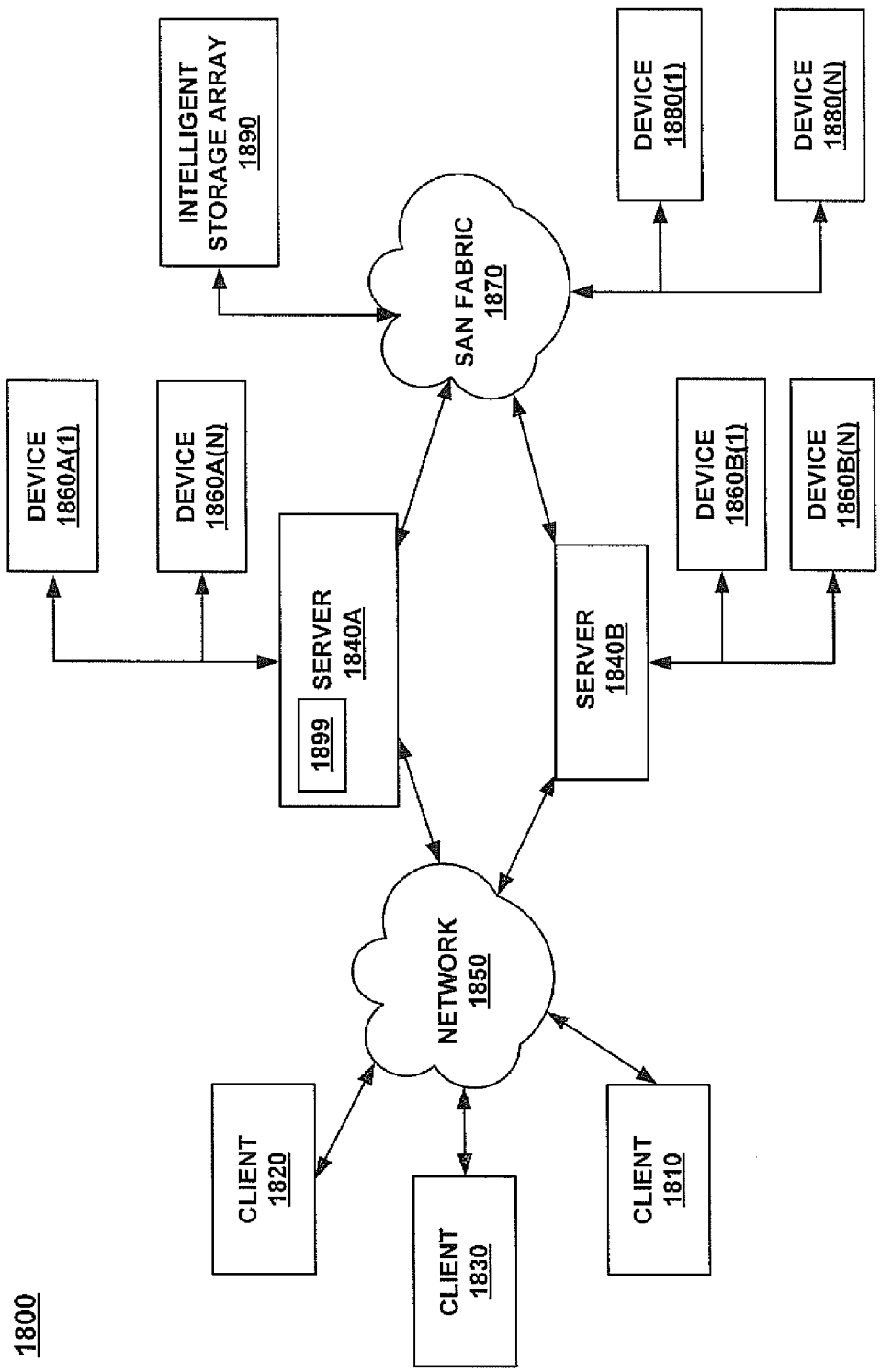
FIG. 8 is a block diagram depicting an exemplary network architecture in accordance with one embodiment of the present invention.
Figure 9:
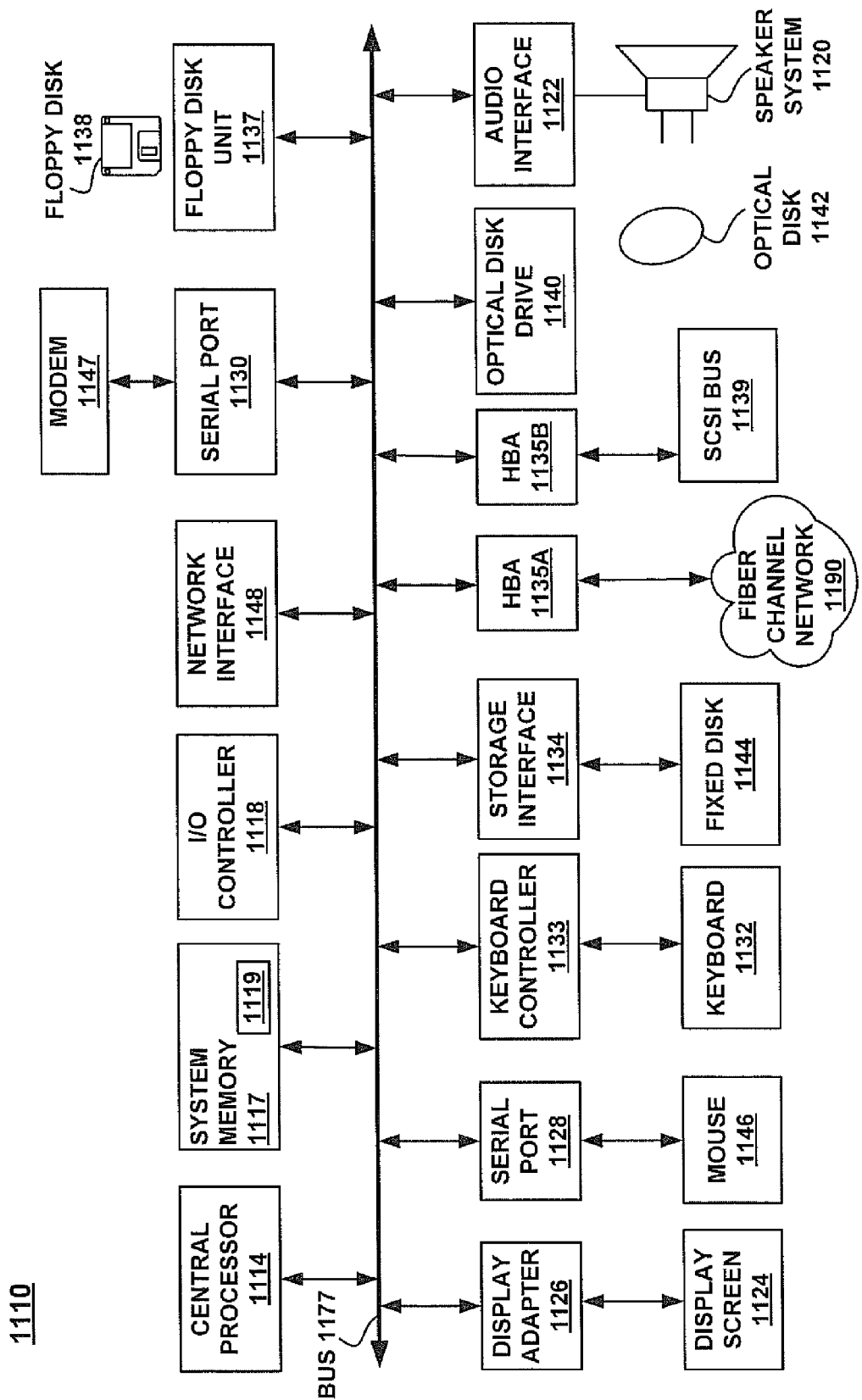
FIG. 9 depicts a block diagram of an exemplary computer system in accordance with one embodiment of the present invention.

FIG. 6 is a block diagram of an exemplary architecture 600 in accordance with one embodiment of the present invention. Architecture 600 includes hypervisor 610, file server 620 and disk 640. Hypervisor 610 includes virtual machine 611 and kernel stack 612. File server 620 includes virtual machine image 621 and network file server share 622. In one embodiment, the virtual machine image can include a temporary file that should be excluded from de-duplication. In one exemplary implementation, the virtual machine image include a VM vmdk image and the temporary file includes a .vsmp file. Input/output acknowledgements (IO ACK) can be passed to the hypervisor 610. In one embodiment the hypervisor is an ESX server and the IO ack is to the ESX. In one embodiment, the file server is exported and mounted on the ESX server. Input/output can also come to storage through a storage network protocol. In one exemplary implementation a de-dup scheduler can start a de-duplication process periodically.

FIG. 7 is a block diagram of exemplary input reduction module 700 which includes instructions for directing a processor in the performance of a storage management method (e.g., input reduction method 100, etc.) in accordance with one embodiment of the present invention. Input reduction module 700 includes exclusion indication module 710 and exclusion module 720. Exclusion indication module 710 includes instructions for indicating information that should be excluded from a subsequent operation. In one embodiment, exclusion indication module 710 includes instructions for performing exclusion indication as indicated in step 110. Exclusion module 720 includes instructions for excluding information from a subsequent operation based upon the exclusion indication performed by module 710. In one embodiment, exclusion module 720 includes instructions for performing exclusion as indicated in step 120. In one embodiment exclusion indication module 710 includes access virtual machine disk image module 711, examination module 712 (e.g., to determine characteristics of the information inn the virtual machine disk image), exclusion block identification module 713 and exclusion block indication forwarding module 714. In one exemplary implementation, virtual machine disk image module 711, examination module 71, exclusion block identification module 713 and exclusion block indication forwarding module 714 include instructions for performing operations as indicated in steps 210, 220, 230 and 240 respectively.

It is appreciated present systems and methods can be implemented as part of a variety of environments. For example, the systems and methods can be implemented as part of a distributed computing environment, a cloud computing environment, a virtual environment, a client server environment, etc. In one embodiment, a storage management method (e.g., method 100, etc.) can be implemented on a network. FIG. 10 is a block diagram depicting an exemplary network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes input reduction module 1899. In one embodiment, input reduction 1899 is similar to input reduction module 700. It is appreciated that present systems and methods are compatible with a variety of implementations. For example, portions of information and instructions associated with can be distributed in various resources.

FIG. 11 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1177 via serial port 1128), a modem 1147 (coupled to bus 1177 via serial port 1130), and a network interface 1148 (coupled directly to bus 1177).

Bus 1177 allows data communication between central processor 1114 and system memory 1117, which may include read-only memory (ROM) or flash memory (neither shown), and random access memory (RAM) (not shown), as previously noted. In one embodiment, instructions for performing a storage method (e.g., similar to method 100, 200, 300, etc.) are stored in one or more memories of computer system 1100 (e.g., in memory location 1119). The RAM is generally the main memory into which the operating system and application programs are loaded. In one embodiment, RAM 1117 includes a input reduction module (e.g., in memory location 1119). In one embodiment, input reduction module stored in memory location 1119 is similar to input reduction module 700. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 10 depicts the use of a network such as the Internet for exchanging data, but the present disclosure is not limited to the Internet or any particular network-based environment.

Thus, the present described systems and methods facilitate efficient and effective de-duplication. Unlike conventional attempts, systems and methods similar to those included in the present detailed description can facilitate exclusion of information from subsequent operations for which the results of performing the subsequent operations on the information offer little or no "effective" benefit. For example, excluding information from de-duplication operations when the information is not likely to be a duplicate (e.g., recently modified, etc) or going to removed shortly anyway (e.g., temporary information, etc.). Present described systems and methods can work directly with a file server or storage unit. The systems and methods can be part of a file system itself or implemented on top of the file system.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A method for reducing an amount of input forwarded to a subsequent operation, the method comprising:
   accessing virtual machine image information from a virtual machine disk image;
   performing an examination process on the virtual machine image information to determine characteristics of the virtual machine image information including life cycle characteristics associated with the virtual machine image information, wherein the determination comprises automatically identifying at least a first portion of the virtual machine image information having a shorter life cycle than a second portion of the virtual machine image information, wherein the first portion of the virtual machine image information includes files that are frequently modified since a previous de-duplication process and temporary files for which de-duplication is not desired, and wherein the examination process is operating system dependent for identifying specific operating system files;
   performing an exclusion block identification process based upon results of the examination process to identify exclusion blocks, wherein the exclusion blocks are identified for exclusion from the subsequent operation along with a downloaded copy of the virtual machine image information that must be committed back to its original data store, and wherein the exclusion blocks include blocks of data used by the frequently modified and the temporary files included in the first portion of the virtual machine image information after loopback mounting of the virtual machine disk image that resides in a mounted checkpoint;
   forwarding an indication of the exclusion blocks to the subsequent operation, wherein the subsequent operation includes at least a de-duplication operation or a backup operation; and
   performing the subsequent operation on the virtual machine disk image the excludes the exclusion blocks.

2. The method of claim 1 wherein the exclusion blocks are excluded from the subsequent de-duplication operation.

3. The method of claim 1 wherein the exclusion blocks are excluded from the subsequent backup operation.

4. The method of claim 1 wherein the exclusion blocks include virtual storage blocks storing information with a short life cycle with respect to the life cycle of other information associated with a virtual machine.

5. The method of claim 1 wherein the exclusion blocks include virtual storage blocks storing information that has been frequently modified since the previous de-duplication process.

6. The method of claim 1 wherein the exclusion blocks include virtual storage blocks storing other information that are otherwise designated for de-duplication avoidance.

7. The method of claim 1 wherein the method is performed within a File Server.

8. A non-transitory computer readable storage medium for reducing an amount of input forwarded to a subsequent operation, the non-transitory computer readable storage medium having stored thereon computer executable instructions that, when executed by a computer system, cause the computer system to perform a method comprising:
   accessing virtual machine image information from a virtual machine disk image;
   performing an examination process on the virtual machine image information to determine characteristics of the virtual machine image information including life cycle characteristics associated with the virtual machine image information, wherein the determination comprises automatically identifying at least a first portion of the virtual machine image information having a shorter life cycle than a second portion of the virtual machine image information, wherein the first portion of the virtual machine image information includes files that are frequently modified since a previous de-duplication process and temporary files for which de-duplication is not desired, and wherein the examination process is operating system dependent for identifying specific operating system files;
   performing an exclusion block identification process based upon results of the examination process to identify exclusion blocks, wherein the exclusion blocks are identified for exclusion from the subsequent operation along with a downloaded copy of the virtual machine image information that must be committed back to its original data store, and wherein the exclusion blocks include blocks of data used by the frequently modified and the temporary files included in the first portion of the virtual machine image information after loopback mounting of the virtual machine disk image that resides in a mounted checkpoint;

forwarding an indication of the exclusion blocks to the subsequent operation, wherein the subsequent operation includes at least a de-duplication operation or a backup operation; and performing the subsequent operation on the virtual machine disk image the excludes the exclusion blocks.

9. The non-transitory computer readable storage medium of claim 8 wherein the exclusion blocks are excluded from the subsequent de-duplication operation.

10. The non-transitory computer readable storage medium of claim 8 wherein the exclusion blocks are excluded from the subsequent backup operation.

11. The non-transitory computer readable storage medium of claim 8 wherein the exclusion blocks include virtual storage blocks storing information with a short life cycle with respect to the life cycle of other information associated with a virtual machine.

12. The non-transitory computer readable storage medium of claim 8 wherein the exclusion blocks include virtual storage blocks storing information that has been frequently modified since the previous de-duplication process.

13. The non-transitory computer readable storage medium of claim 8 wherein the exclusion blocks include virtual storage blocks storing other information that are otherwise designated for de-duplication avoidance.

14. The non-transitory computer readable storage medium of claim 8 wherein the method is performed within a File Server.

15. A computer system for reducing an amount of input forwarded to a subsequent operation, the computer system comprising:

a processor coupled to a computer readable storage media and executing computer readable code which causes the computer system to perform operations including:

accessing virtual machine image information from a virtual machine disk image;

performing an examination process on the virtual machine image information to determine characteristics of the virtual machine image information including life cycle characteristics associated with the virtual machine image information, wherein the determination comprises automatically identifying at least a first portion of the virtual machine image information having a shorter life cycle than a second portion of the virtual machine image information, wherein the first portion of the virtual machine image information includes files that are frequently modified since a previous de-duplication process and temporary files for which de-duplication is not desired, and wherein the examination process is operating system dependent for identifying specific operating system files;

performing an exclusion block identification process based upon results of the examination process to identify exclusion blocks, wherein the exclusion blocks are identified for exclusion from the subsequent operation along with a downloaded copy of the virtual machine image information that must be committed back to its original data store, and wherein the exclusion blocks include blocks of data used by the frequently modified and the temporary files included in the first portion of the virtual machine image information after loopback mounting of the virtual machine disk image that resides in a mounted checkpoint;

forwarding an indication of the exclusion blocks to the subsequent operation, wherein the subsequent operation includes at least a de-duplication operation or a backup operation; and performing the subsequent operation on the virtual machine disk image the excludes the exclusion blocks.

16. The computer system of claim 15 wherein the exclusion blocks are excluded from the subsequent de-duplication operation.

17. The computer system of claim 15 wherein the exclusion blocks are excluded from the subsequent backup operation.

18. The computer system of claim 15 wherein the exclusion blocks include:

virtual storage blocks storing information with a short life cycle with respect to the life cycle of other information associated with a virtual machine; and virtual storage blocks storing information that has been frequently modified since the previous de-duplication process.

19. The computer system of claim 18 wherein the exclusion blocks include:

virtual storage blocks storing other information that are otherwise designated for de-duplication avoidance.

20. The computer system of claim 15 wherein the method is performed within a File Server.

* * * * *